(12) United States Patent
Morav et al.

(10) Patent No.: US 11,574,079 B2
(45) Date of Patent: Feb. 7, 2023

(54) MULTI-STAGE PROVISIONING OF SECRET DATA

(71) Applicant: Nuvoton Technology Corporation, Hsin-chu (TW)

(72) Inventors: Dan Morav, Herzliya (IL); Ziv Hershman, Givat Shmuel (IL); Oren Tanami, Ra'anana (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 0 days.

(21) Appl. No.: 17/331,665

(22) Filed: May 27, 2021

(65) Prior Publication Data

US 2022/0382911 A1 Dec. 1, 2022

(51) Int. Cl.
| | |
|---|---|
| *G06F 21/72* | (2013.01) |
| *G06F 21/79* | (2013.01) |
| *G06F 21/64* | (2013.01) |
| *G06F 21/33* | (2013.01) |
| *G06F 21/60* | (2013.01) |

(52) U.S. Cl.
CPC ............ *G06F 21/72* (2013.01); *G06F 21/33* (2013.01); *G06F 21/602* (2013.01); *G06F 21/64* (2013.01); *G06F 21/79* (2013.01); *G06F 2221/0751* (2013.01)

(58) Field of Classification Search
CPC ........ G06F 21/72; G06F 21/33; G06F 21/602; G06F 21/64; G06F 21/79; G06F 2221/0751
See application file for complete search history.

(56) References Cited

U.S. PATENT DOCUMENTS

| | | | |
|---|---|---|---|
| 8,332,641 | B2 | 12/2012 | Case et al. |
| 8,631,247 | B2 | 1/2014 | O'Loughlin et al. |
| 8,966,657 | B2 | 2/2015 | Martinez et al. |
| 8,977,864 | B2 | 3/2015 | Kocher et al. |

(Continued)

FOREIGN PATENT DOCUMENTS

| | | | |
|---|---|---|---|
| EP | 3407242 A1 | * 11/2018 | |
| WO | WO-2013015806 A1 | * 1/2013 | ............. G06F 21/73 |

OTHER PUBLICATIONS

Tanami et al., U.S. Appl. No. 16/914,535, filed Jun. 29, 2020.

*Primary Examiner* — Shin-Hon (Eric) Chen
*Assistant Examiner* — Ethan V Vo
(74) *Attorney, Agent, or Firm* — Kligler & Associates Patent Attorneys Ltd

(57) ABSTRACT

A method for provisioning an electronic device includes providing a semiconductor wafer on which multiple integrated circuit (IC) chips have been fabricated. Each chip includes a secure memory and programmable logic, which is configured to store at least two keys in the secure memory and to compute digital signatures over data using the at least two keys. A respective first key is provisioned into the secure memory of each of the chips via electrical probes applied to contact pads on the semiconductor wafer. After dicing of the wafer, a respective second key is provisioned into the secure memory of each of the chips via contact pins of the chips. A respective provisioning report is received from each of the chips with a digital signature computed by the logic using both of the respective first and second keys. The provisioning is verified based on the digital signature.

19 Claims, 3 Drawing Sheets

(56) References Cited

U.S. PATENT DOCUMENTS

| | | |
|---|---|---|
| 9,430,658 B2 | 8/2016 | Covey et al. |
| 2010/0284539 A1 | 11/2010 | Roy et al. |
| 2010/0287374 A1 | 11/2010 | Roy et al. |
| 2012/0250429 A1* | 10/2012 | Tailliet ............. G01R 31/31719 |
| | | 438/18 |
| 2013/0238899 A1* | 9/2013 | Neill ....................... G06F 21/72 |
| | | 713/165 |
| 2014/0093074 A1* | 4/2014 | Gotze ..................... G06F 21/73 |
| | | 380/45 |
| 2014/0164779 A1 | 6/2014 | Hartley et al. |
| 2016/0171223 A1* | 6/2016 | Covey ................... G06F 21/572 |
| | | 713/189 |
| 2017/0180131 A1 | 6/2017 | Ghosh et al. |
| 2018/0097803 A1* | 4/2018 | Iwanir ..................... H04L 63/14 |
| 2018/0337776 A1 | 11/2018 | Miller et al. |
| 2019/0245702 A1 | 8/2019 | Ben Simon et al. |
| 2020/0344075 A1* | 10/2020 | Gremaud ............. H04L 9/0894 |

\* cited by examiner

MULTI-STAGE PROVISIONING OF SECRET DATA

FIELD OF THE INVENTION

The present invention relates generally to integrated circuit devices, and particularly to methods and systems for provisioning secret data in such devices, as well as devices that are provisioned by such methods.

BACKGROUND

Key provisioning is the process of inserting keys and other secure information into an electronic device, such as a system-on-chip (SoC) integrated circuit (IC). Once a cryptographic key has been provisioned in an IC chip, it can be used to verify secure operations, authenticate the chip and the product in which it is installed, and protect both the chip and the product against tampering. Such chips typically contain a secure memory and logic circuits, which ensure that once the cryptographic key has been provisioned and stored in the memory of the chip, it can be verified on the basis of a digital signature, but the secret part of the key itself cannot be extracted.

Keys are typically provisioned in IC chips as a part of the manufacturing process under tight security to ensure that malicious parties cannot gain access to the keys. Maintaining the required level of security can be complicated when devices are manufactured and provisioned in a multi-stage process, which may involve multiple entities. For this reason, it is desirable that keys be provisioned in the IC manufacturing stage, which may be considered more secure than system-level assembly.

In this regard, for example, U.S. Pat. No. 9,430,658 describes methods for secure provisioning in production electronic circuits. A first entity (e.g., a chip manufacturer) embeds one or more secret values into copies of the circuit. A second entity (e.g., an OEM): 1) derives a trust anchor from a code signing public key; 2) embeds the trust anchor in a first circuit copy; 3) causes the first circuit copy to generate a secret key derived from the trust anchor and the embedded secret value(s); 4) signs provisioning code using a code signing private key; and 5) sends the code signing public key, the trust anchor, and the signed provisioning code to a third entity (e.g., a product manufacturer). The third entity embeds the trust anchor in a second circuit copy and causes it to: 1) generate the secret key; 2) verify the signature of the signed provisioning code using the code signing public key; and 3) launch the provisioning code. The OEM can authenticate the second circuit copy using the first circuit copy and a challenge/response protocol.

SUMMARY

Embodiments of the present invention that are described hereinbelow provide methods for provisioning of electronic devices, as well systems for carrying out such provisioning and devices that can be provisioned by such methods.

There is therefore provided, in accordance with an embodiment of the invention, a method for provisioning an electronic device. The method includes providing a semiconductor wafer on which multiple integrated circuit (IC) chips have been fabricated. Each chip includes a secure memory and programmable logic, which is configured to store at least two keys in the secure memory and to compute digital signatures over data using the at least two keys. A respective first key is provisioned into the secure memory of each of the chips via electrical probes applied to contact pads on the semiconductor wafer. After dicing of the wafer, a respective second key is provisioned into the secure memory of each of the chips via contact pins of the chips. A respective provisioning report is received from each of the chips with a digital signature computed by the logic using both of the respective first and second keys. The provisioning is verified based on the digital signature.

In a disclosed embodiment, provisioning the respective first key takes place during a process of testing of the chips on the wafer using the electrical probes. Additionally or alternatively, provisioning the respective second key takes place during a process of testing each of the chips.

In a disclosed embodiment, provisioning the respective first key is performed by a first provisioning appliance, and provisioning the respective second key is performed by second provisioning appliance, which is separate from and independent of the first provisioning appliance.

In some embodiments, the method includes loading program code, which is signed with a trusted signature, into each of the chips for execution by the programmable logic, wherein the respective provisioning report is received from each of the chips after loading the program code. Additionally or alternatively, receiving the respective provisioning report includes receiving from each chip a respective public key for use in communicating with the chip, wherein the public key is signed using both of the respective first and second keys.

Further additionally or alternatively, receiving the respective provisioning report includes receiving first and second security certificates generated by each of the chips with respect to the respective first and second keys. In a disclosed embodiment, storing the first and second security certificates in a repository, checking the repository periodically for duplications of the first and second security certificates, and issuing an alert when a duplication is detected.

There is also provided, in accordance with an embodiment of the invention, a system for provisioning an electronic device. The system includes electrical probes configured to make contact with contact pads on a semiconductor wafer on which multiple integrated circuit (IC) chips have been fabricated. Each chip includes a secure memory and programmable logic, which is configured to store at least two keys in the secure memory and to compute digital signatures over data using the at least two keys. A connector is configured to connect with contact pins of each of the chips after dicing the wafer. At least one provisioning appliance is configured to provision a respective first key into the secure memory of each of the chips via the electrical probes that are applied to the semiconductor wafer and, after dicing of the wafer, to provision a respective second key into the secure memory of each of the chips via the connector and the contact pins, and to receive from each of the chips a respective provisioning report with a digital signature computed by the logic using both of the respective first and second keys and to verify the provisioning based on the digital signature.

There is additionally provided, in accordance with an embodiment of the invention, an integrated circuit chip, including a secure memory and programmable logic, which is configured to receive at least first and second keys, which are provisioned at different, first and second stages in a process of production of the chip, to store the keys in the secure memory, and to compute and output a digital signature using both of the respective first and second keys.

In some embodiments, the programmable logic is configured to output a provisioning report including the digital signature after loading program code, which is signed with a trusted signature, into the chip for execution by the programmable logic. In a disclosed embodiment, the provisioning report output by the programmable logic includes a public key for use in communicating with the chip, wherein the public key is signed by the programmable logic with the digital signature using both of the first and second keys. Additionally or alternatively the provisioning report includes first and second security certificates generated by the programmable logic with respect to the respective first and second keys.

The present invention will be more fully understood from the following detailed description of the embodiments thereof, taken together with the drawings in which:

DETAILED DESCRIPTION OF EMBODIMENTS

Figure 1:
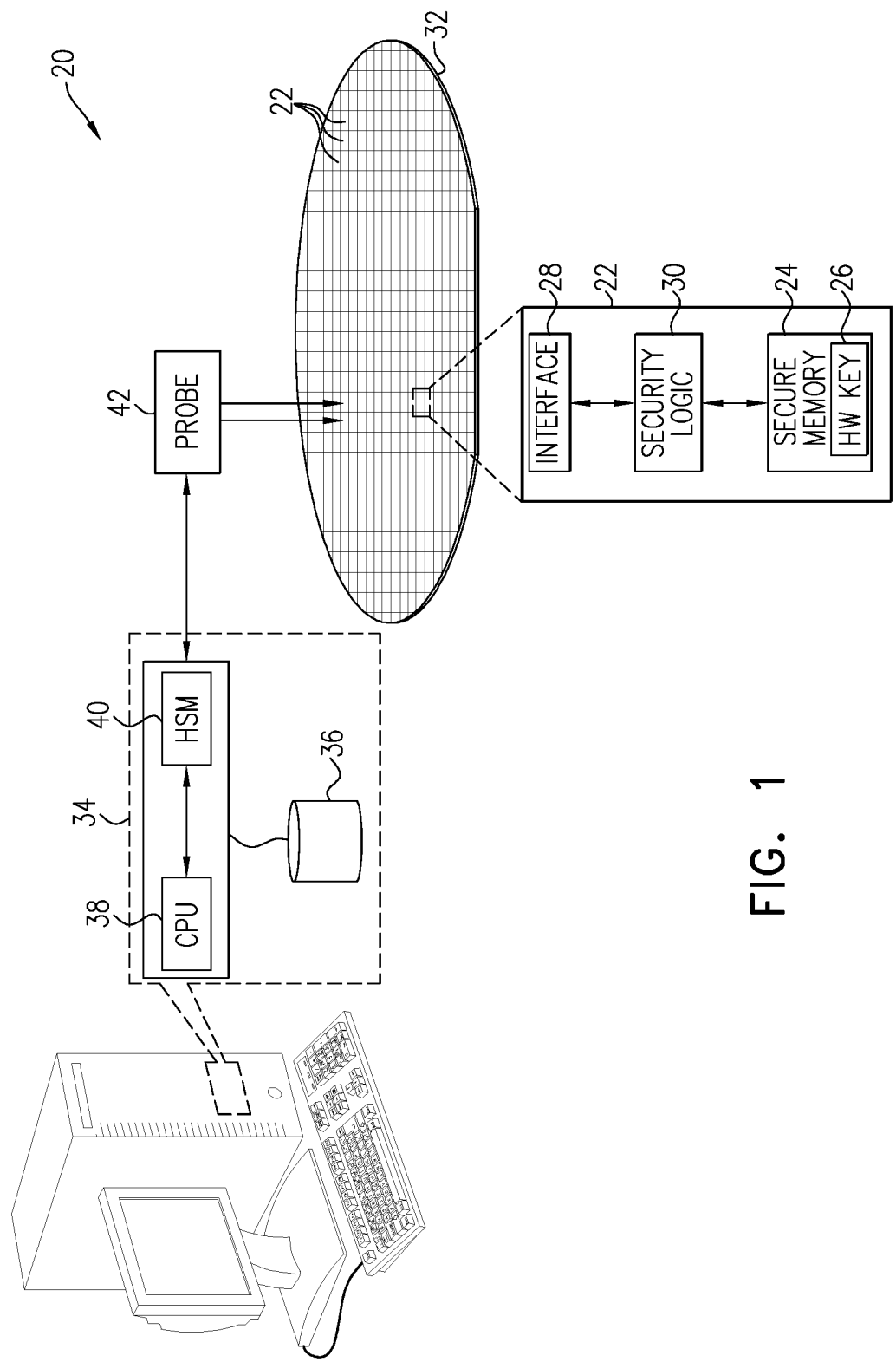
FIG. 1 is a block diagram that schematically illustrates a system for provisioning of IC chips at wafer level, in accordance with an embodiment of the invention.

Secure IC chips are designed so that once a key has been provisioned in memory on the chip, the key is protected from unauthorized access and use. During the manufacturing process, however, a malicious insider, such as a disloyal employee of the chip manufacturer, may be able to gain access to key values that are stored in a provisioning appliance. (The term "provisioning appliance" is used in the context of the present description and in the claims to refer to production equipment that is used in transferring keys and related data to the chip.) When the IC chip is subsequently integrated into a computerized system, the stolen key value can be used by an attacker to compromise the entire system, or to build a rogue system that appears to be genuine.

Embodiments of the present invention that are described herein address this problem by applying a multi-stage provisioning approach: Two (or more) different keys are provisioned in the chip at different stages of the manufacturing process, and then both keys are used together in verifying the provisioning. Even if an attacker is able to gain access to one of the keys, it will be insufficient for purposes of attacking the chip or a system in which it has been integrated, i.e., to extract sufficient information to enable unauthorized use of the keys, for example in certifying a false device. The provisioning process itself is concomitantly less vulnerable to malicious insiders, as there is no longer any single point in the process (i.e., no single time or location) at which all of the key information is accessible.

The embodiments that are described hereinbelow begin with a semiconductor wafer on which multiple IC chips have been fabricated. Each chip including a secure memory and programmable logic, which is configured to store at least two keys in the secure memory and to compute digital signatures over data using these keys. A respective first key is provisioned into the secure memory of each of the chips via electrical probes applied to contact pads on the semiconductor wafer, for example by a provisioning appliance during a process of wafer-level testing. After the wafer has been diced into separate chips, a respective second key is provisioned into the secure memory of each of the chips via contact pins of the chips, for example during a process of testing the individual chips. This latter stage can be performed by a different provisioning appliance, which is separate from and independent of the provisioning appliance used in provisioning the first key, and may even be in a different facility. A malicious party will have to gain access to both of these separate stages of provisioning in order to acquire the complete key information.

To verify the integrity of the provisioning process and enable subsequent use of the chips in secure operations, each chip generates and outputs a provisioning report with a digital signature computed by the programmable logic on the chip using both of the first and second keys. At this stage, the programmable logic typically generates a pair of public and private keys, and outputs the public key, signed with the first and second keys, as part of the provisioning report, which proves possession of the private keys (or the secrets used to derive the key pairs), and thus establishes that the chip is genuine. Alternatively, the provisioning report may take any other suitable form that enables the recipient to receive the digital signature and thus verify that the chip contains both of the first and second keys. Once both keys have been verified in this manner, subsequent verification of digital signatures, after the chip has been integrated into a product, for example, can be carried out using only one of the two keys, since all of the secret information is known to be stored securely in the chip and cannot be tampered with.

Another advantage of the present embodiments is that verification of provisioning takes place only after the entire IC provisioning process has been completed in the IC manufacturing and test facility. No prior handshake is required between the provisioning appliances and the chip during the stages of device manufacturing and test; and the first stage of provisioning, at wafer level, is entirely unidirectional, meaning that no response is required from the provisioned chips to the provisioning appliance. Thus, despite the increased complexity inherent in the two-stage provisioning protocol, the actual provisioning can be carried out using existing test equipment as part of the standard manufacturing process, with little or no added delay in the overall process.

FIG. 1 is a block diagram that schematically illustrates a system 20 for provisioning of IC chips 22 that have been fabricated on a semiconductor wafer 32, in accordance with an embodiment of the invention. Each chip 22 comprises a secure memory 24 and programmable security logic 30, which is configured to store multiple keys in memory 24 and to compute digital signatures over data using the keys. Logic 30 is capable of performing secure cryptographic operations, as well as other functions, and typically comprises a programmable microcontroller or microprocessor core, which runs under the control of suitable program code. Alternatively or additionally, logic 30 comprises hard-wired and/or programmable digital logic circuits. Logic 30 is connected to an interface 28, for example in the form of contact pads on wafer 32, through which data and other signals can be transferred to and from chip 22.

Secure memory 24 comprises a non-volatile memory (NVM), such as a one-time programmable (OTP) memory or electrically-programmable read-only memory (ROM), which can be accessed only by logic 30. Memory 24 contains a hardware key 26, which is programmed into the memory or designed into the logic during fabrication of wafer 32 for use as a global secret in subsequent programming stages, as described below. In the course of these programming stages, logic 30 will store (at least) two additional keys in secure memory 24 and will use the keys in computing one or more digital signatures. Memory 24 typically comprises additional non-volatile and/or volatile random-access memory (RAM) for storing program code, such as firmware and/or software code, as well as data.

A provisioning appliance 34 provisions a respective first key into secure memory 24 of each chip 22 via probes 42, which make contact with the contact pads on each chip in wafer 32. This first key is thus referred to hereinafter as the "circuit probe" (CP) key. Probes 42 may be a part of a wafer testing system (not shown), to which appliance is coupled for purposes of provisioning. As noted earlier, this provisioning may conveniently be carried out as part of a standard wafer-scale testing regimen, such as the testing that is used to detect faulty chips in the wafer-sort stage of production. Alternatively, provisioning of the CP key may be carried out independently of any testing stage.

Provisioning appliances are known in the art of secure manufacturing, and any suitable appliance of this sort may be used in system 20. In the pictured embodiment, provisioning appliance 34 comprises a secure, trusted computer with a central processing unit (CPU) 38 and a memory 36, which contains programming instructions and data. To ensure the security and integrity of the CP keys that are provisioned into chips 22, appliance 34 comprises a tamper-proof hardware security module (HSM) 40 for generating, encrypting and transferring the key values and other data via probes 42 to chips 22. Each CP key is encrypted by HSM 40 using hardware key 26, and is then transferred to chip 22 as a binary large object (BLOB) together with an accompanying digital certificate, which attests to the authenticity of the key. (Optionally, the digital certificate may also be encrypted.) HSM 40 signs the digital certificate using a signing key protected by the HSM. Logic 30 decrypts and parses the BLOB, using hardware key 26, and stores the CP key in memory 24.

Figure 2:
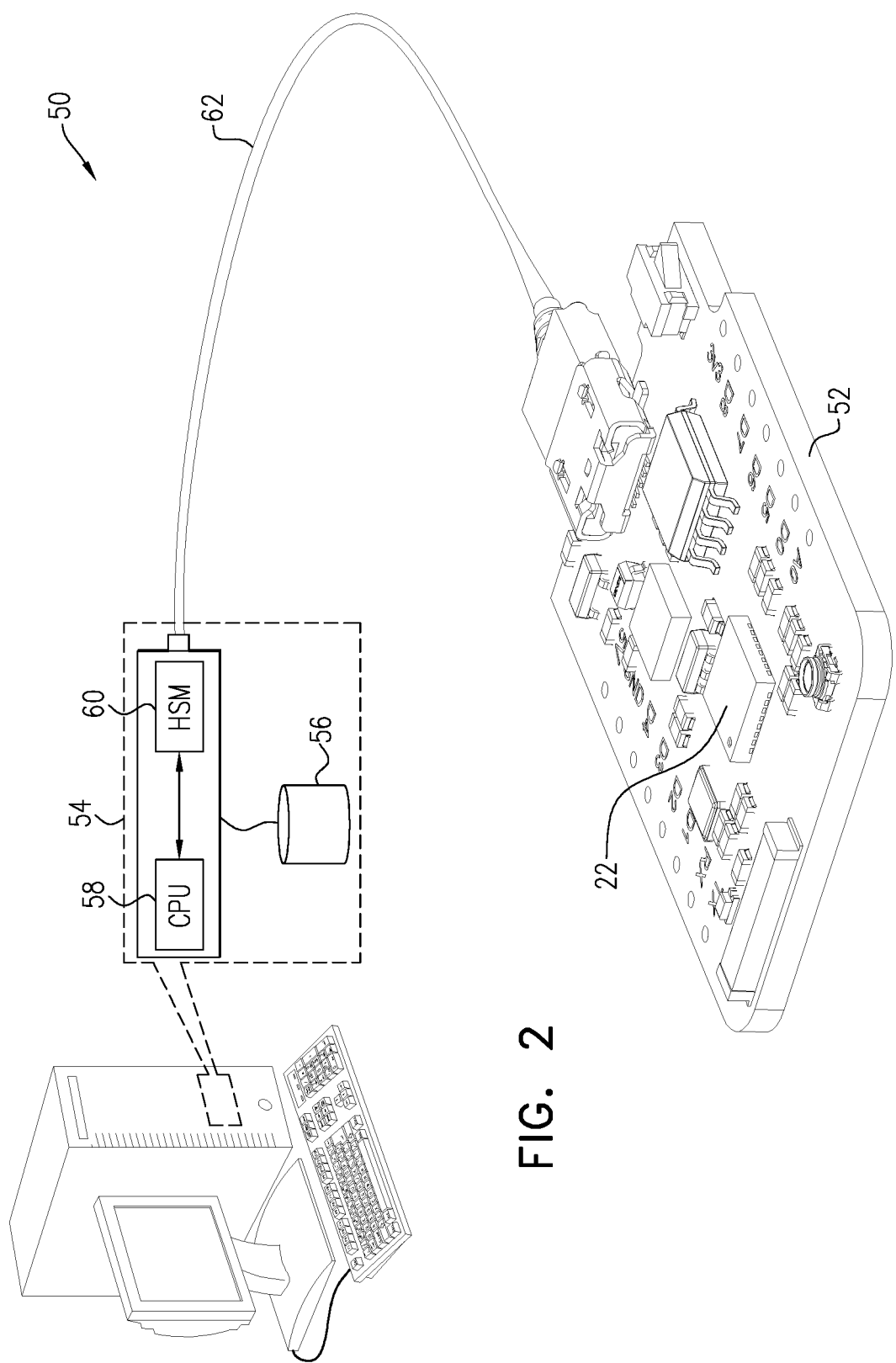
FIG. 2 is a block diagram that schematically illustrates a system for provisioning of IC chips after dicing, in accordance with an embodiment of the invention.

FIG. 2 is a block diagram that schematically illustrates a system 50 for provisioning of IC chips 22, in accordance with an embodiment of the invention. In system 50, wafer 32 (FIG. 1) has been diced so as to separate chips 22, and the chips have been packaged or otherwise prepared for integration into an electronic device. At this stage, for example, chip 22 may be mounted on a circuit board 52, such as a test fixture or the actual device into which the chip is to be integrated. In this configuration, interface 28 is connected to contact pins on the chip package or die, which thus may be soldered to traces on circuit board 52. Alternatively, system 50 may be applied to provision individual chips directly, rather than through a circuit board. In either case, depending on the type of packaging, the contact pins may take the form of legs on an IC package or solder bumps on an IC die, for example, or any other suitable sorts of chip connections that are known in the art.

A provisioning appliance 54 provisions a respective second key into secure memory 24 of each chip 22 via a connector 62, which makes contact with the contact pins on chip 22 either directly or via circuit board 52 (as illustrated in FIG. 2). Appliance 54, like appliance 34 (FIG. 1), comprises a secure, trusted computer with a CPU 58 and a secure memory 56, along with an HSM 60. Connector 62 may be a part of a final testing system or a system for out-sourced assembly and test (not shown), to which appliance 54 is coupled for purposes of provisioning. The key that is provisioned by appliance 54 is thus referred to hereinafter as the "final test" (FT) key. Although the same provisioning appliance could be used in provisioning both the CP key and the FT key, it is advantageous that appliances 34 and 54 be separate and independent in order to foil potential attacks by malicious insiders.

Figure 3:
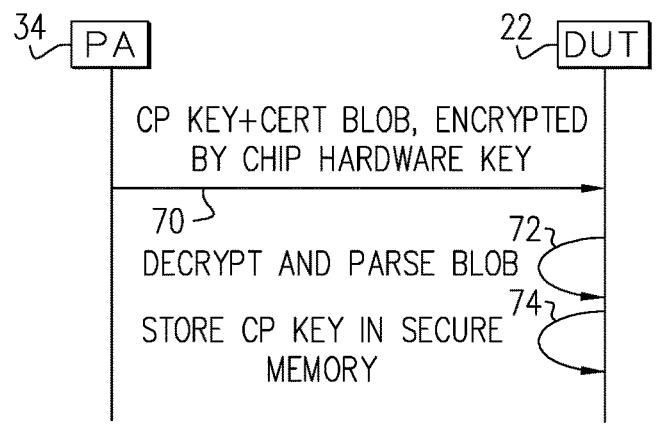
FIG. 3 is a ladder diagram that schematically illustrates a method for provisioning of IC chips at wafer level, in accordance with an embodiment of the invention.

FIG. 3 is a ladder diagram that schematically illustrates a method for provisioning of IC chips 22 at wafer level, in accordance with an embodiment of the invention. For the sake of clarity and concreteness, this method is described here with reference to system 20 (FIG. 1), and specifically to chip 22 (referred to as a "device under test," or DUT) and provisioning appliance (PA) 34. Alternatively, this method may be carried out in other system configurations, as will be apparent to those skilled in the art after reading the present description.

After connecting to chip 22 via probes 42, provisioning appliance 34 downloads a BLOB, containing the respective CP key and a digital certificate attesting to the authenticity of the CP key, to chip 22, at a CP download step 70. The certificate is signed by HSM 40 using a protected signing key. The BLOB is encrypted using hardware key 26 of chip 22, using a copy of the key that is protected by HSM 40. Logic 30 in chip 22 decrypts the BLOB, using hardware key 26, and parses the decrypted BLOB to extract the CP key, at a CP decryption step 72. Logic 30 stores the CP key in secure memory 24, at a CP storage step 74.

Logic 30 is programmed so that after storage of the CP key at step 74, logic 30 will access the CP key only after suitable program code has been loaded into chip 22 and run by logic 30. This mode of operation of chip 22 is referred to as the production (PROD) state. This configuration feature prevents any further access to or use of the CP key at the wafer level.

Figure 4:
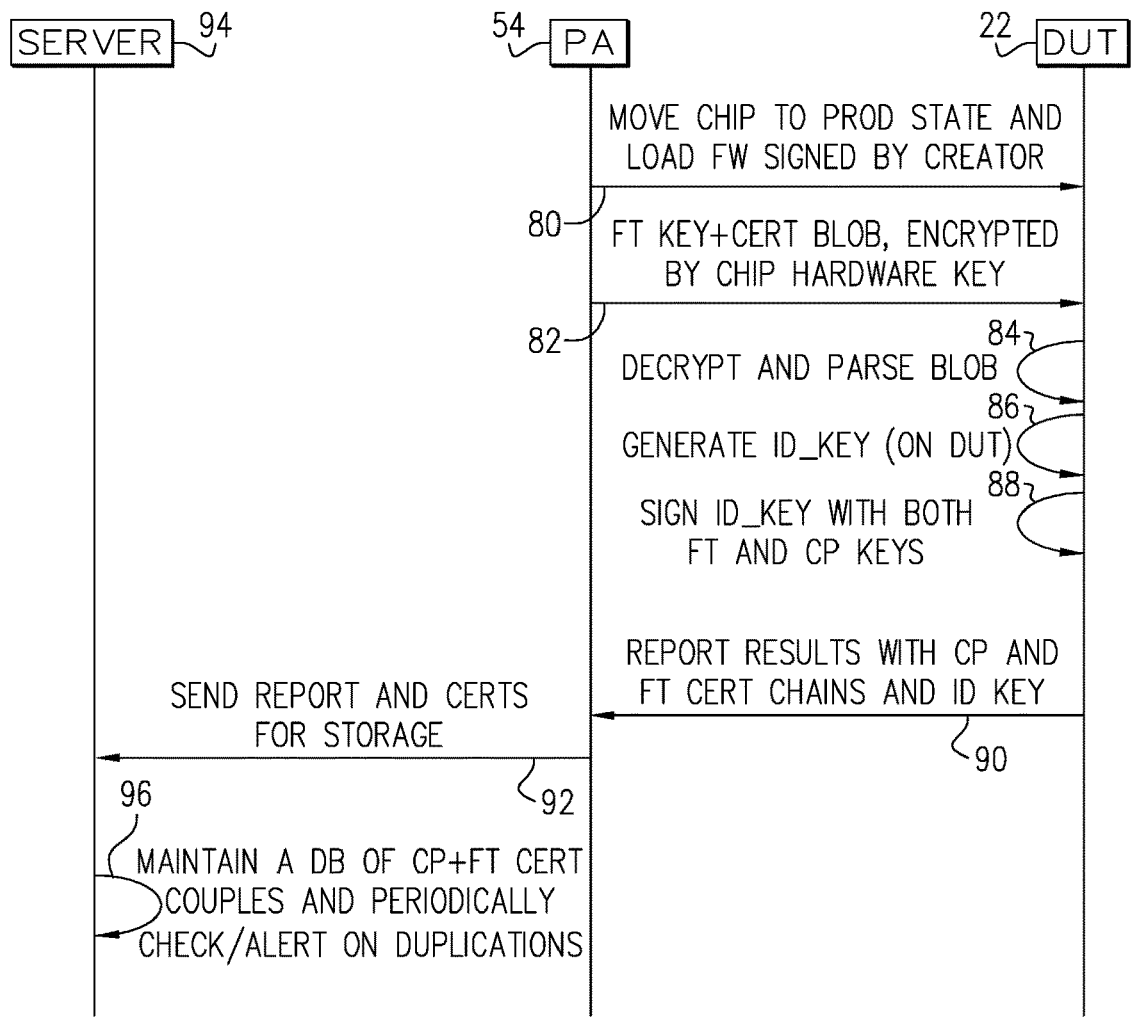
FIG. 4 is a ladder diagram that schematically illustrates a method for provisioning and verifying IC chips after dicing, in accordance with an embodiment of the invention.

FIG. 4 is a ladder diagram that schematically illustrates a method for provisioning and verifying IC chips 22 after dicing, in accordance with an embodiment of the invention. Again, for the sake of clarity and concreteness, this method is described here with reference to system 50 (FIG. 2), and specifically to chip 22 and provisioning appliance 54. Alternatively, this method may be carried out in other system configurations, as will be apparent to those skilled in the art after reading the present description.

At a code loading step 80, provisioning appliance 54 signals chip 22, via connector 62, that it is to enter the PROD state explained above, and downloads program code to the chip, for example in the form of firmware code. This code is transmitted with a trusted digital signature, which enables logic 30 in chip 22 to verify that the code is authentic and trusted. Logic 30 will not accept and load any code that is not properly authenticated. Provisioning appliance 54 downloads a BLOB, containing the respective FT key and a digital certificate attesting to the authenticity of the FT key, signed by HSM 60, to chip 22, at an FT download step 82. The BLOB is again encrypted using hardware key 26 of chip 22. (Alternatively, the order of steps 80 and 82 may be reversed.)

Logic 30 in chip 22 decrypts the BLOB, using hardware key 26, parses the decrypted BLOB to extract the FT key, at an FT decryption step 84, and stores the FT key in secure memory 24, as well.

Logic 30 generates a public/private key pair for subsequent use in communication with chip 22, at a key generation step 86. For example, logic 30 may receive a seed value from a random number generator on chip 22 and then apply a key derivation function (KDF) to the seed value in order to generate the public and private keys. The public key is referred to herein as the "ID key." Logic 30 generates a digital signature over the ID key using both the CP key and the FT key that are stored in secure memory 24, at a signature generation step 88. This digital signature may comprise, for example, two sub-signatures computed with the CP key and FT key respectively; or alternatively, the sub-signatures may be concatenated or otherwise mixed in the digital signature. In any case, a valid digital signature can be computed at this stage only if both the CP key and FT key are used.

After steps 80 through 88 have been completed, logic generates and outputs a provisioning report via connector 62 to provisioning appliance 54, at a reporting step 90. The report contains the CP and FT certificates that chip 22 received with the CP and FT keys at steps 70 and 82, along with the ID key generated at step 86 and the digital signature computed at step 88. Provisioning appliance 54 checks the certificates and the digital signature in order to verify the validity of the ID key and certificates. As noted earlier, chip 22 will be verified and released for use in the field and will then be able to receive service only after this verification, which can be completed only if both the CP key and the FT key have been successfully provisioned in memory 24.

In some embodiments, for enhanced long-term security, provisioning appliance 54 passes the provisioning reports and the corresponding pairs of CP and FT certificates to a repository for storage, at a report storage step 92. For example, the provisioning appliance may transmit the reports and certificates over a network to a server 94, which maintains a database containing the certificates. Server 94 periodically checks the repository for duplications of the pairs of CP and FT security certificates, at a couple checking step 96. When a duplication is detected, server 94 issues an alert, for example to the manufacturer of chips 22. This sort of alert can be useful in detecting and warning of attempts to compromise the security of chips 22 by reusing previous secret values, for example in a replay attack. To guard against this sort of use, server 94 and/or provisioning appliance 54 may maintain a "revocation list" of keys and certificates that have been compromised and may consult this list in responding to subsequent queries that reference the keys and certificates in question.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for provisioning an electronic device, the method comprising:
providing a semiconductor wafer on which multiple integrated circuit (IC) chips have been fabricated, each chip including a secure memory and programmable logic, which is configured to store at least two keys in the secure memory and to compute digital signatures over data using the at least two keys;
provisioning a respective first key into the secure memory of each of the chips via electrical probes applied to contact pads on the semiconductor wafer;
after dicing of the wafer, provisioning a respective second key into the secure memory of each of the chips via contact pins of the chips;
receiving from each of the chips a respective provisioning report with a digital signature computed by the logic using both of the respective first and second keys; and verifying the provisioning based on the digital signature.

2. The method according to claim 1, wherein provisioning the respective first key takes place during a process of testing of the chips on the wafer using the electrical probes.

3. The method according to claim 1, wherein provisioning the respective second key takes place during a process of testing each of the chips.

4. The method according to claim 1, wherein provisioning the respective first key is performed by a first provisioning appliance, and provisioning the respective second key is performed by second provisioning appliance, which is separate from and independent of the first provisioning appliance.

5. The method according to claim 1, and comprising loading program code, which is signed with a trusted signature, into each of the chips for execution by the programmable logic, wherein the respective provisioning report is received from each of the chips after loading the program code.

6. The method according to claim 1, wherein receiving the respective provisioning report comprises receiving from each chip a respective public key for use in communicating with the chip, wherein the public key is signed using both of the respective first and second keys.

7. The method according to claim 1, wherein receiving the respective provisioning report comprises receiving first and second security certificates generated by each of the chips with respect to the respective first and second keys.

8. The method according to claim 7, and comprising storing the first and second security certificates in a repository, checking the repository periodically for duplications of the first and second security certificates, and issuing an alert when a duplication is detected.

9. A system for provisioning an electronic device, the system comprising:
electrical probes configured to make contact with contact pads on a semiconductor wafer on which multiple integrated circuit (IC) chips have been fabricated, each chip including a secure memory and programmable logic, which is configured to store at least two keys in the secure memory and to compute digital signatures over data using the at least two keys;
a connector configured to connect with contact pins of each of the chips after dicing the wafer; and
at least one provisioning appliance, which is configured to provision a respective first key into the secure memory of each of the chips via the electrical probes that are applied to the semiconductor wafer and, after dicing of the wafer, to provision a respective second key into the secure memory of each of the chips via the connector and the contact pins, and to receive from each of the chips a respective provisioning report with a digital signature computed by the logic using both of the respective first and second keys and to verify the provisioning based on the digital signature.

10. The system according to claim 9, wherein provisioning the respective first key takes place during a process of testing of the chips on the wafer using the electrical probes.

11. The system according to claim 9, wherein provisioning the respective second key takes place during a process of testing each of the chips.

12. The system according to claim 9, wherein the at least one provisioning appliance comprises a first provisioning appliance, which provisions the respective first key, and a second provisioning appliance, which provisions the respective second key, wherein the second provisioning appliance is separate from and independent of the first provisioning appliance.

13. The system according to claim 9, wherein the respective provisioning report is received from each of the chips after loading program code, which is signed with a trusted signature, into each of the chips for execution by the programmable logic.

14. The system according to claim 9, wherein the respective provisioning report received from each chip comprises a respective public key for use in communicating with the chip, wherein the public key is signed using both of the respective first and second keys.

15. The system according to claim 9, wherein the respective provisioning report comprises first and second security certificates generated by each of the chips with respect to the respective first and second keys.

16. The system according to claim 15, and comprising a server, which is configured to store the first and second security certificates in a repository, and to check the repository periodically for duplications of the first and second security certificates, and issue an alert when a duplication is detected.

17. An integrated circuit chip, comprising:
a secure memory; and
programmable logic, which is configured to receive at least first and second keys, which are provisioned at different, first and second stages in a process of production of the chip, to store the keys in the secure memory, and to compute and output a digital signature using both of the respective first and second keys,
wherein the programmable logic is configured to receive the first key during a process of testing of the chip by application of electrical probes to contact pads on a wafer on which the chip is fabricated and to receive the second key via contact pins of the chip during a process of testing of the chip after dicing of the wafer, and
wherein the programmable logic is configured to output a provisioning report including the digital signature after loading program code, which is signed with a trusted signature, into the chip for execution by the programmable logic.

18. The chip according to claim 17, wherein the provisioning report output by the programmable logic comprises a public key for use in communicating with the chip, wherein the public key is signed by the programmable logic with the digital signature using both of the first and second keys.

19. The chip according to claim 17, wherein the provisioning report comprises first and second security certificates generated by the programmable logic with respect to the respective first and second keys.

* * * * *